US007011405B2

(12) United States Patent
Chen

(10) Patent No.: US 7,011,405 B2
(45) Date of Patent: Mar. 14, 2006

(54) FLEXIBLE GLASSES FRAME

(76) Inventor: Hongbiao Chen, Shenkeng Industrial District, Liuyue, Henggang Town, Shenzhen, Guangdong, 518000 (CN)

( * ) Notice: Subject to any disclaimer, the term of this patent is extended or adjusted under 35 U.S.C. 154(b) by 0 days.

(21) Appl. No.: 10/979,206

(22) Filed: Nov. 3, 2004

(65) Prior Publication Data

US 2005/0094092 A1 May 5, 2005

(30) Foreign Application Priority Data

| | | | |
|---|---|---|---|
| Nov. 4, 2003 | (CN) | ...................... | 200320117679 U |
| Nov. 4, 2003 | (CN) | ...................... | 200320117680 U |
| Nov. 4, 2003 | (CN) | ...................... | 200320117681 U |
| Nov. 4, 2003 | (CN) | ...................... | 200320117682 U |
| Nov. 4, 2003 | (CN) | ...................... | 200320117683 U |
| Dec. 12, 2003 | (CN) | ...................... | 200320104416 U |

(51) Int. Cl.
*G02C 5/14* (2006.01)

(52) U.S. Cl. ....................... 351/111; 351/110; 351/116; 351/123; 351/141

(58) Field of Classification Search .................. 351/41, 351/110, 111–123, 140–143, 153; 16/228
See application file for complete search history.

(56) References Cited

U.S. PATENT DOCUMENTS

| | | | | |
|---|---|---|---|---|
| 5,805,259 | A * | 9/1998 | Chao | .......................... 351/110 |
| 6,736,504 | B1 * | 5/2004 | Hermsen | .................... 351/116 |

* cited by examiner

*Primary Examiner*—Huy Mai
(74) *Attorney, Agent, or Firm*—Rosenberg, Klein & Lee

(57) ABSTRACT

A flexible glasses frame comprises two bundles of soft pull rope set up on outboard of two lens respectively, each bundle of soft pull rope should include at least one piece of soft pull rope. At least two tail nail should be fixed on the end of rope which is far away from lens. The leg of eyeglasses is made of soft material, assorted with various parts, assembled as new type of glasses temple, posses strong points of simple production, low cost, convenient assembling, portable convenience, lightness and small, closely cling to head shape of wearer and etc. Length of the leg can be adjusted to best size as per different head shape.

22 Claims, 20 Drawing Sheets

FLEXIBLE GLASSES FRAME

FIELD OF THE INVENTION

This invention relates to components of glasses, particularly to glasses frame.

BACKGROUND OF THE INVENTION

As all known, glasses is a must to overcome eyesight issue in daily life and work. With the development of advanced science and technology, user seeks for convenient and comfortable wearing.

The requirement for comfort and convenience of glasses are embodied in following key points:

1. Weight: To reduce weight of glasses, light materials introduced to produce lens and glasses frame, as well improvement in various components of hominess glass frame such as bow, temple, hinge connecting bow and temple, and other structure.

2. Personal shaping frame for comfortable wear: in general, glasses frame are mass produced with unified industrial standard, however, shapes of people's heads are differ from one to another, which then requires glasses frame to be adjustable to fit. Presently, glasses frame with flexible hinge or as like to fit different requirements.

3. Easy to carry: Foldable component such as foldable temple or as like are introduced to meet this requirement.

Further satisfactions of mentioned requirements are limited and hard to breakthrough cause the component of lens and hominess frame.

As a result, improvements in current inconvenience and defects fields in glasses frame are necessary.

SUMMARY OF THE INVENTION

The purpose of this invention is to provide a soft pull rope as breakthrough temple to improve the frame structure which then leads to light weight, personal shaping for different heads and easy to carry.

The technical parts of this invention as follow:

A flexible glasses frame comprises two bundles of soft pull rope set up on outboard of two lens respectively, each bundle of soft pull rope should include at least one piece of soft pull rope. At least two tail nail should be fixed on the end of rope which is far away from lens. This invention adopt soft material as the leg of glasses, associated with various parts and assembled as new glasses temple material, which then posses simply manufacturing method with cost efficiency, assemble convenience, portable convenience, dapper and lightness, cling to wearer head and other superior characteristics, the leg of glasses can be adjusted to best size as per different head shape.

BRIEF DESCRIPTION OF THE DRAWINGS

Further illustration based on combination of attached fig and detailed implementation as follow, thereinto.

DESCRIPTION OF THE PREFERRED EMBODIMENT

Figure 1:
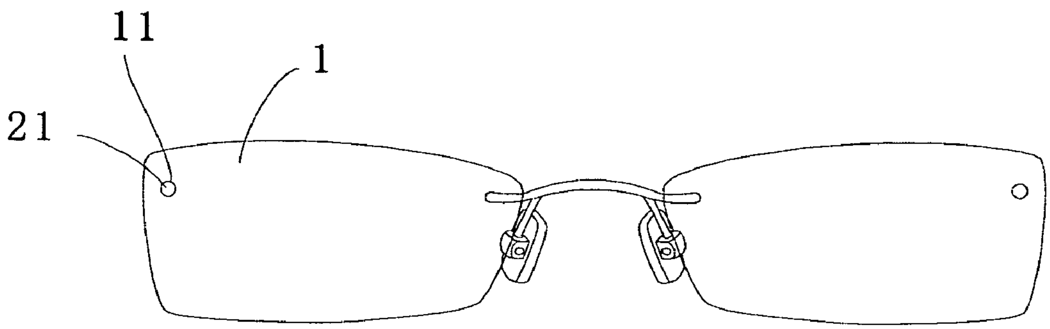
FIG. 1 is the front view of the first embodiment of this invention.
Figure 2:
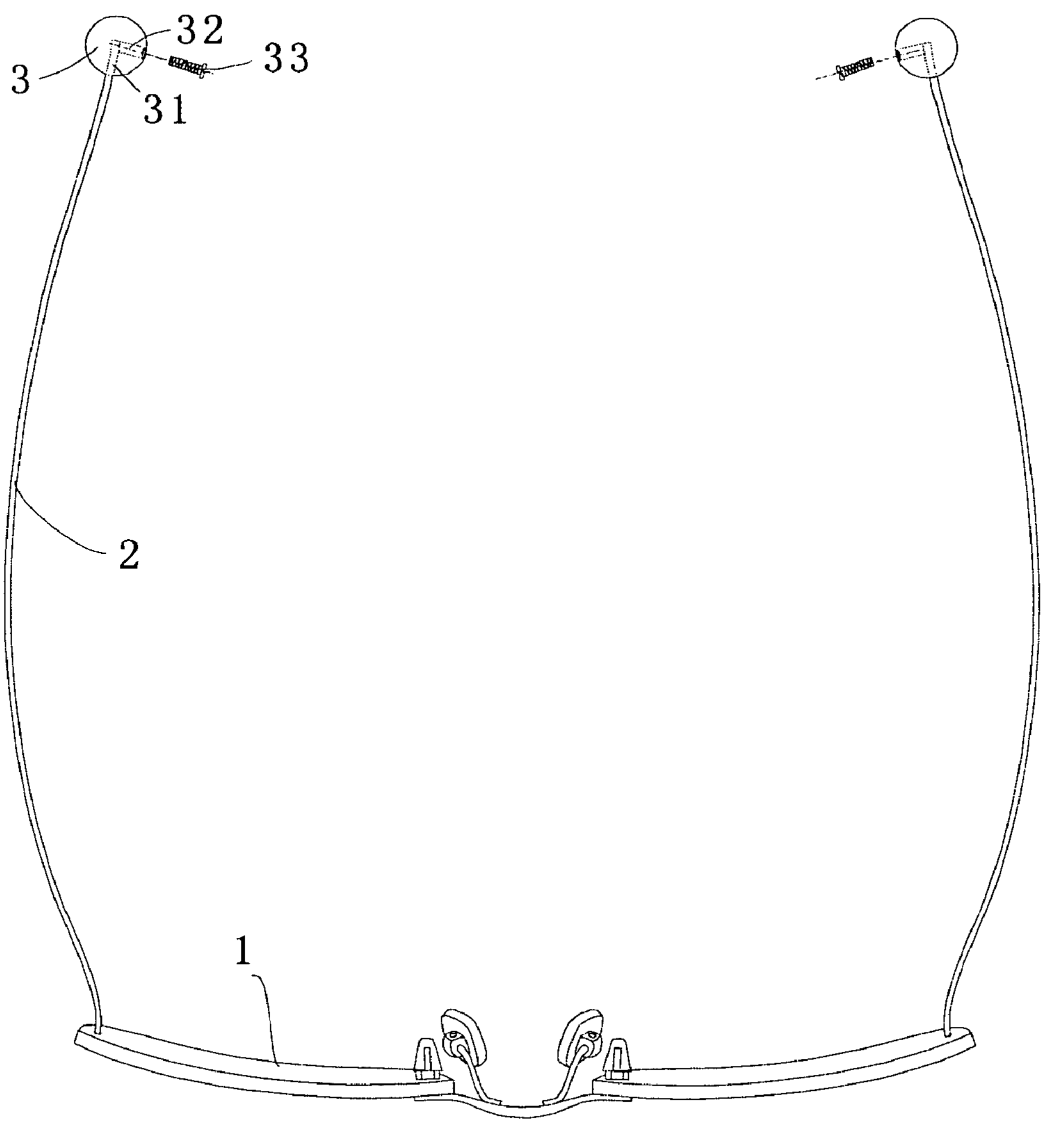
FIG. 2 is the Top view of FIG. 1.
Figure 3:
FIG. 3 is the Right side view of FIG. 1.

Referring to FIGS. 1 to 3, it is the first implementation method of this invention.

Installation hole 11 are fixed on outboard of two lens, the installation hole 11 on lens 1 can be one or several, one piece illustrated on the FIG.

Glasses temple includes two bundles of rope 2 and tail nail 3, each rope 2 can be composed of one or several piece of rope, one bundle of rope is composed of one piece of rope as illustrated in FIG., each group of rope 2 can be designed as composed of multi-piece of rope corresponding to multi installation hole 11 or one piece of rope to go through multi installation holes 11 in order, which is actually rope bundle 2 composed of multi folding of rope but appear to be composed of multi pieces of ropes in form.

The rope 2 is made of plastic material. Rope 2 go through installation hole 11 on lens 1, then its end is melt to form a big end 21 which is larger than the installation hole, therefore the end of rope 2 will not fall off from installation hole 11. Of course in order to fix the rope 2, the section of rope 2 which go through the installation hole 11 can be melt or stick to the hole 11. Installation hole 31 is fixed to tail nail 3, a screw hole 32 is fixed to the vertical connected position with installation hole 31; the end of rope 2 is inserted into installation 31 on the tail nail 3, bolt 33 is screwed into screw hole 32 and press rope 2 tightly. The end of plastic rope can be fixed on tail nail by melting.

Upon wearing, the rope 2 should be positioned on ear, pull rope 2 via tail nail 3 thereby take on the glasses, rope joint with face and closely fit to head shape of wearer. If rope 2 is too long, tail nail 3 can be taken off, cut the extra section of rope 2, then fix the tail nail 3, therefore the length of temple can be adjusted the best size based on different head shape of wearer. Adopt rope 2 and tail nail 3 to form glasses frame, therefore the frame is extremely light and can be folded at will, with comfortable wearing and portable convenience.

Rope 2 are made of plastic material, which is cost effective and convenient to change, i.e. convenient assembling and maintenance.

FIGS. 4 to 8 illustrate second implementation method.

Figure 4:
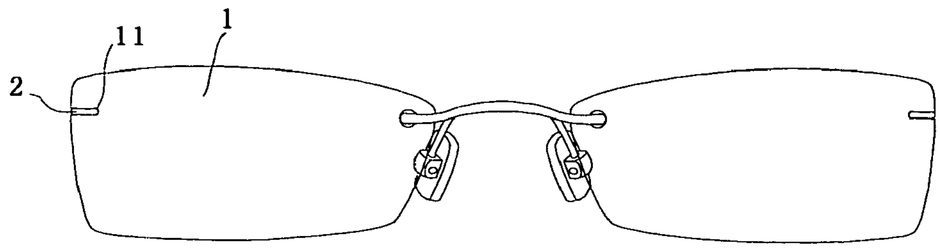
FIG. 4 is the front view of the second embodiment of this invention.
Figure 5:
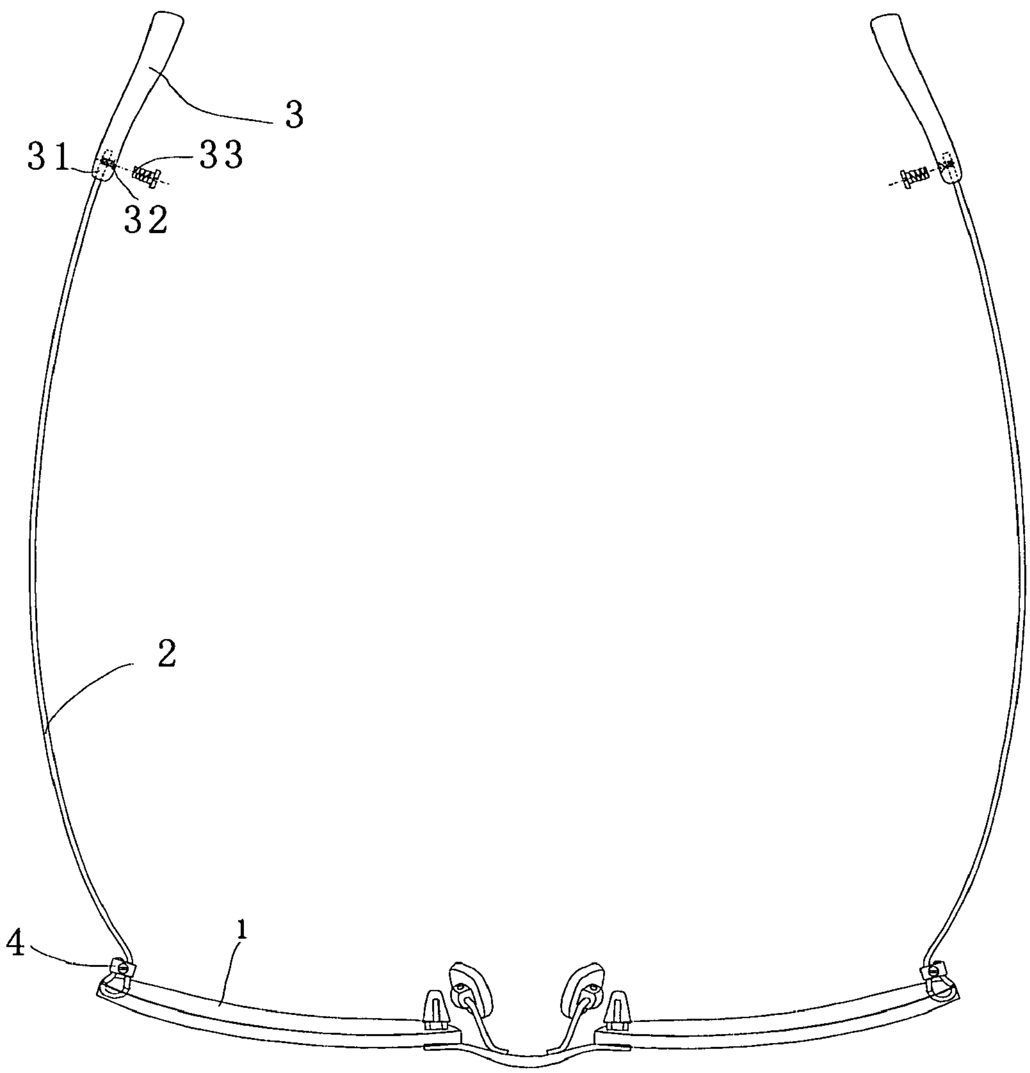
FIG. 5 is the Top view of FIG. 4.
Figure 6:
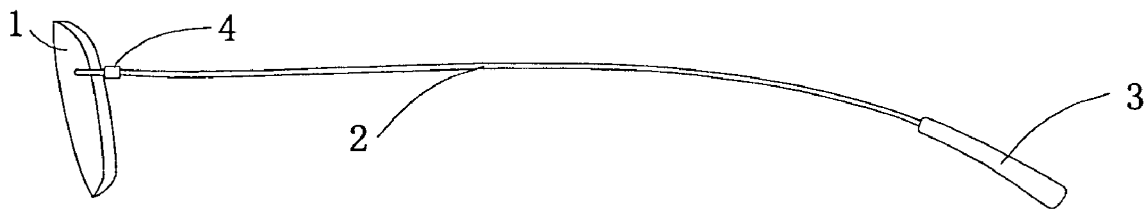
FIG. 6 is the Right side view of FIG. 4.

Referring to FIGS. 4 to 6, the outboard of two glasses lens 1 are fixed with at least two installation holes 11 respectively, the furthermost installation hole is actually the groove run through outboard flank of lens. Installation hole 11 on each lens 1 can be two or multi piece, there are two of them illustrated on FIG.

Glasses frames are composed of 2 bundles of rope 2 and tail nail 3, each bundle of rope 2 includes one piece or multi piece of rope, each group of rope is composed of one piece of rope in the FIG. illustration. Rope 2 is fixed inside installation hole 11 via linker 4.

Figure 7:
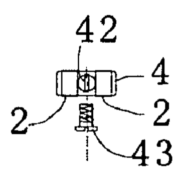
FIG. 7 is the Top view of linker in FIG. 4.
Figure 8:
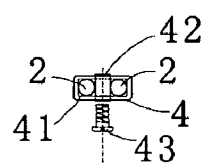
FIG. 8 is the front view of FIG. 7

Referring to FIGS. 7 and 8, a through rectangle hole 41 is located on middle section of linker 4, a screw hole 42 is fixed on vertical connecting position with installation hole 41, a bolt 43 are fixed inside the screw hole 42; the width of rectangle hole 41 fit the diameter of rope 2, the length of it fit the totals of two times of diameter of rope 2 plus diameter of screw bolt 43. End of rope 2 goes through the rectangle hole 41 on linker 4, and two installation holes 11 on outboard of lens in order, then the rectangle hole 41 on linker 4, hereby screw bolt 43 is screwed into screw hole 42 and press the rope 2 on both sides tightly. Rope 2 is made of plastic material, rope 2 goes through rectangle hole 41 on linker 4, and then the end of it is melt to form a big end so that the end of rope 2 can not fall off rectangle hole 41.

Figure 9:
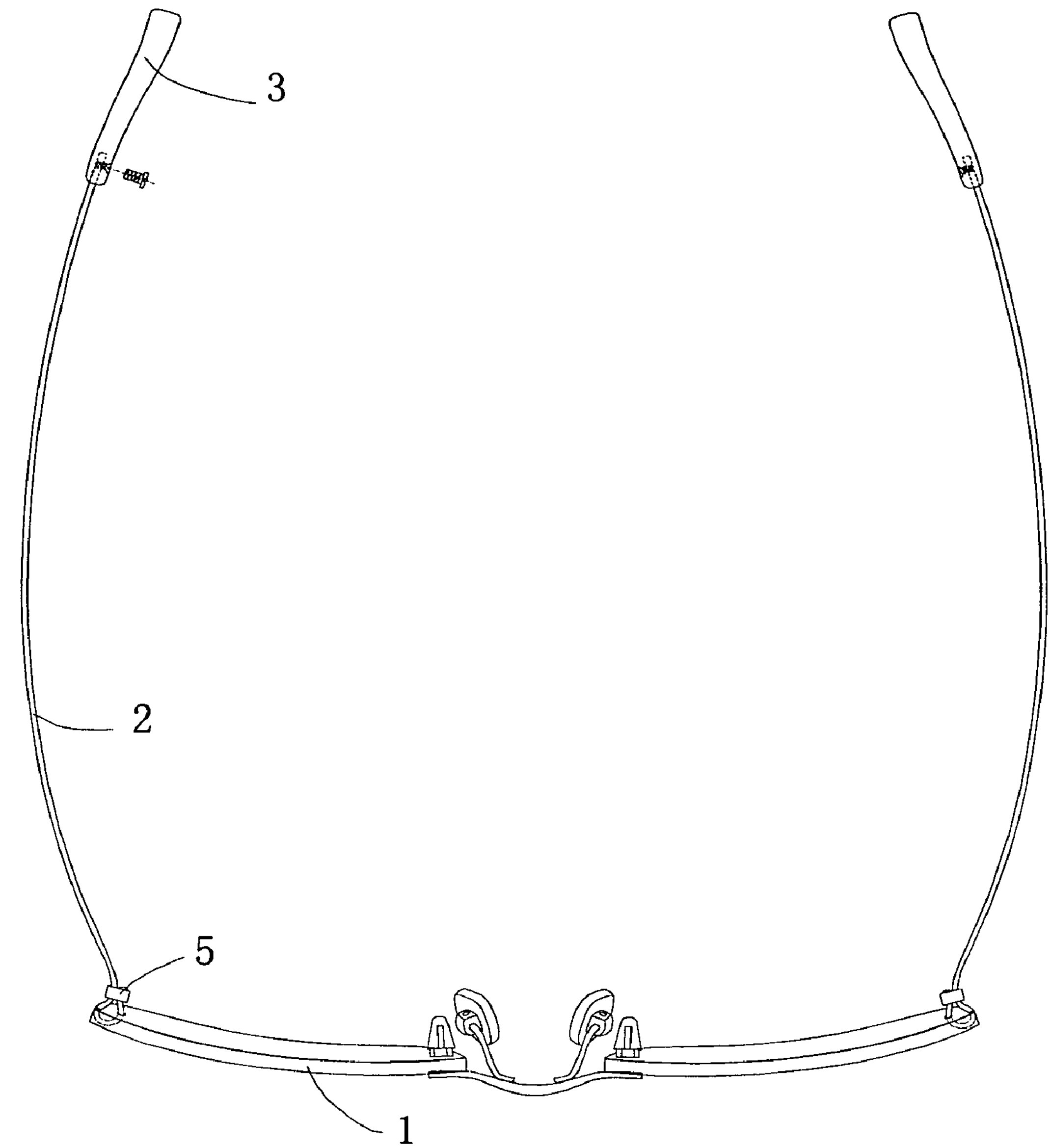
FIG. 9 is the front view of the third embodiment of this invention.
Figure 10:
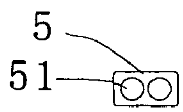
FIG. 10 is the Top view of linker in FIG. 9
Figure 11:
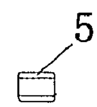
FIG. 11 is the Right side view of FIG. 10.

The third implementation method of this invention is illustrated by FIGS. 9 to 11.

Rope 2 is made of plastic material; two thorough hole 51 on linker 5 fit with rope, the end of rope 2 goes through thorough hole 51 of linker 5, then goes through two installation hole 11 on outboard of lens in order, then goes through another thorough hole 51 of linker 5, rope 2 goes through thorough hole 51 on linker 5, then the end of it is melt to form a big end larger than thorough hole 51 so that the end of rope 2 will not fall off from thorough hole 51.

Figure 12:
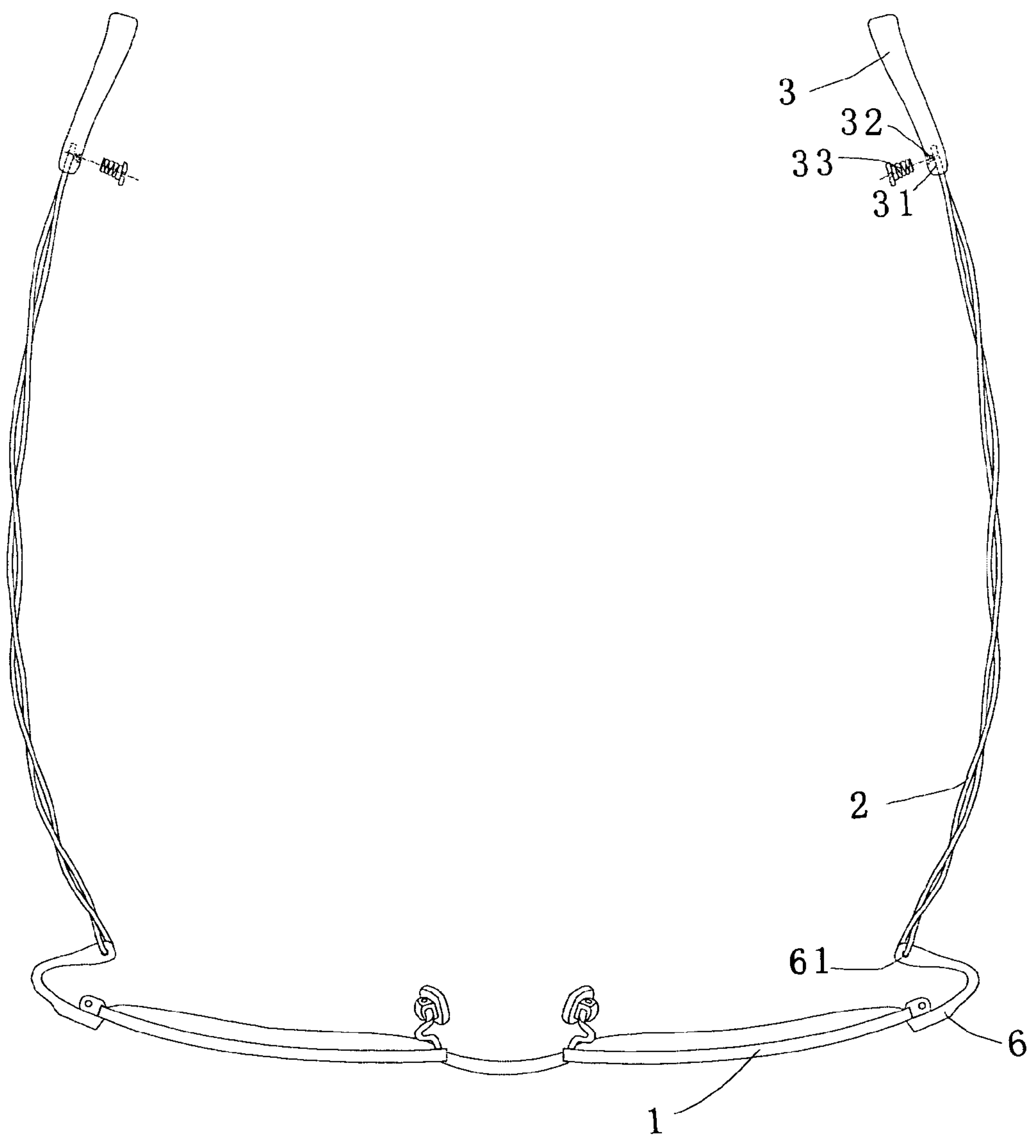
FIG. 12 is the Structure illustration view of the fourth embodiment of this invention.
Figure 13:
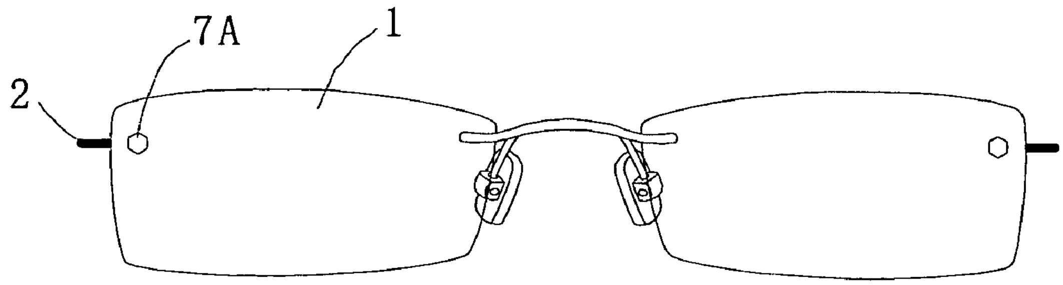
FIG. 13 is the front view of the fifth embodiment of this invention.
Figure 14:
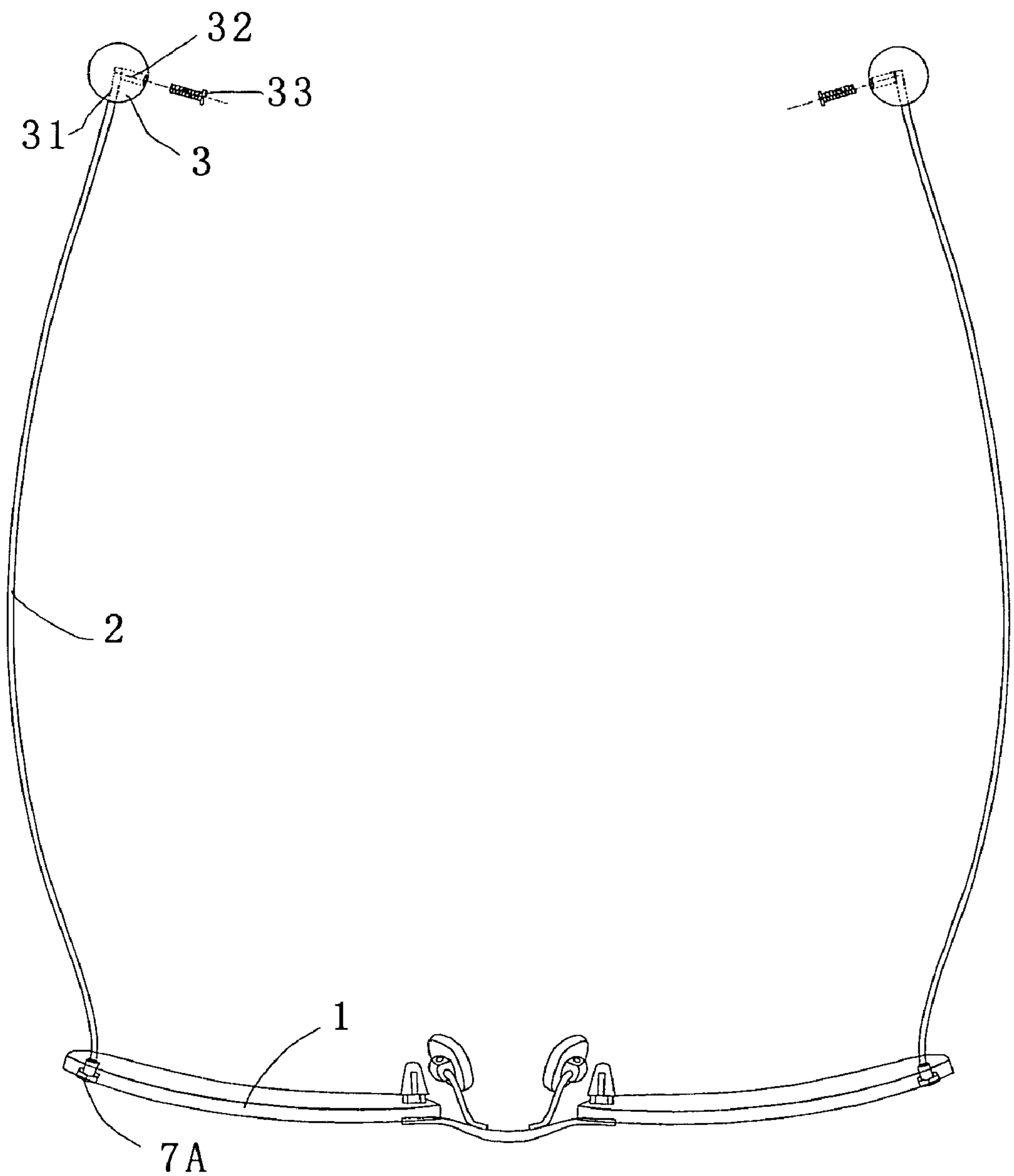
FIG. 14 is the Top view of FIG. 13.
Figure 15:
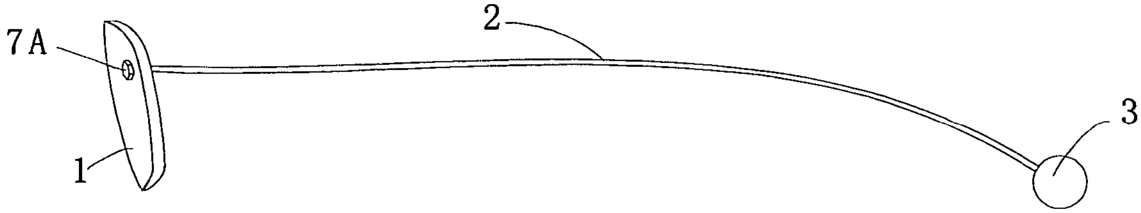
FIG. 15 is the Right side view of FIG. 13.
Figure 16:
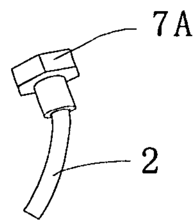
FIG. 16 is the Connection structure view of pin nail and rope in FIG. 13.

The fourth implementation method is illustrated by FIG. 12.

Bow ends 6 are fixed on outboard of two lens 1 respectively, installation hole 61 is fixed on bow end 6, installation hole 61 fixed on bow end 6 can be one or multi piece, one piece is illustrated on FIG.

Two bundles of rope 2 can be composed of one or multi piece of rope, FIG. illustrate one bundle of rope composed of rope 2 goes through installation hole 61 of bow end 6, which formed double folding rope, design corresponding to multi installation hole 61 can be made, of which each group of rope 2 can be designed as composed of multi-piece of rope or one piece of rope to go through multi installation holes in order, which is actually rope bundle 2 composed of multi folding of rope but appear to be composed of multi pieces of ropes in form or other form.

The fifth implementation method is illustrated in FIGS. 13 to 16.

"T" shape pin nail 7A are fixed on outboard of two lens 1 respectively, there can be one or multi piece of pin nail 7A, FIG. illustrate one piece. FIG. illustrates that two bundles of rope are composed of one piece of rope 2 respectively. Rope 2 is made of plastic material, end of each rope 2 are fixed on pin nail 7A with melting.

Figure 17:
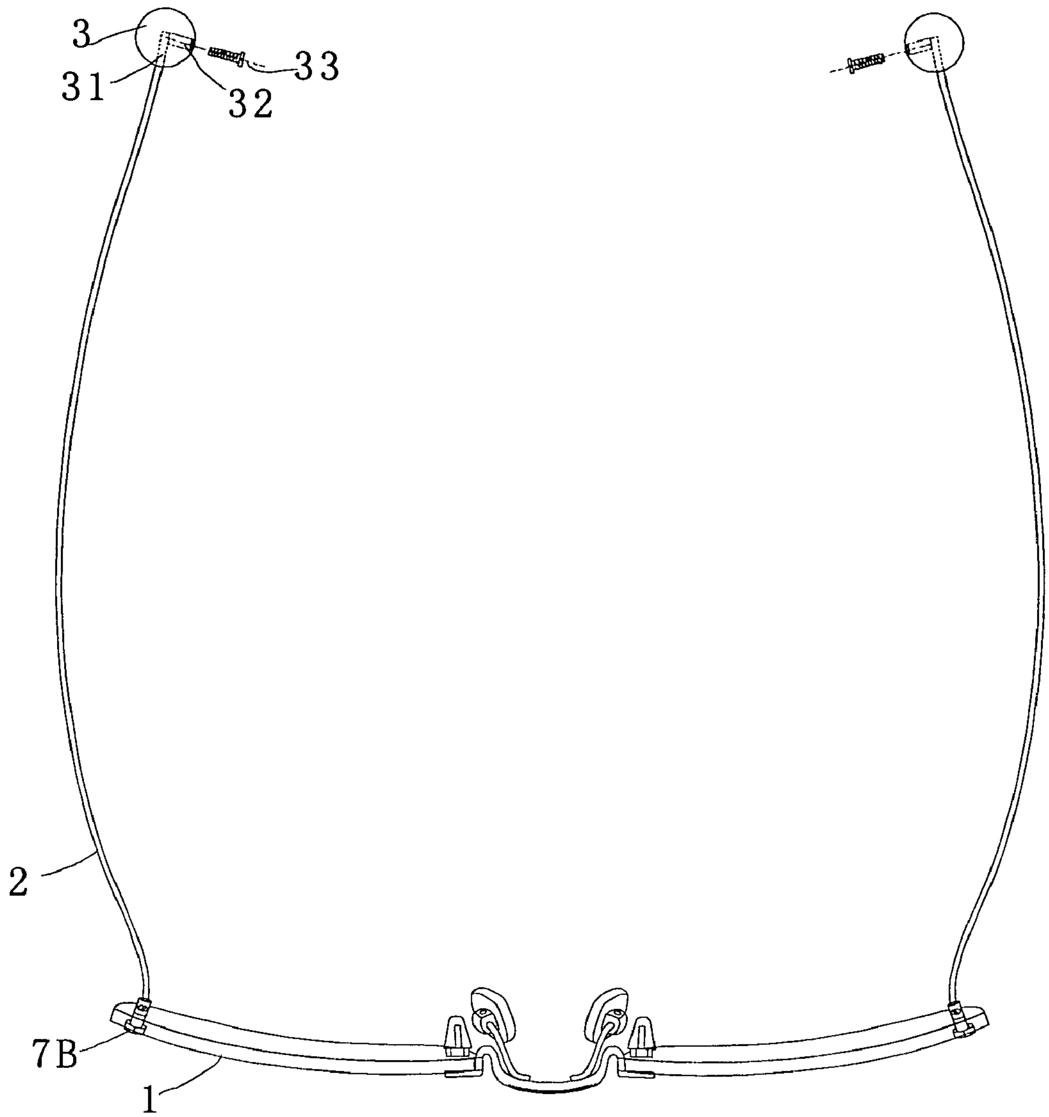
FIG. 17 is the front view of the sixth embodiment of this invention.
Figure 18:
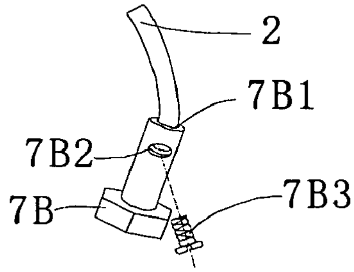
FIG. 18 is the Connection structure view of pin nail and rope in FIG. 17.

The sixth implementation method is illustrated in FIGS. 17 and 18.

Installation hole 7B1 is fixed on smaller section of "T" shape pin nail, a screw hole 7B2 is fixed on vertical connecting position with installation hole 7B1; end of rope 2 is inserted into installation hole 7B1 of this pin nail 7B, a bolt 7B3 are screw into screw hole 7B2 to press rope 2 tightly.

Figure 19:
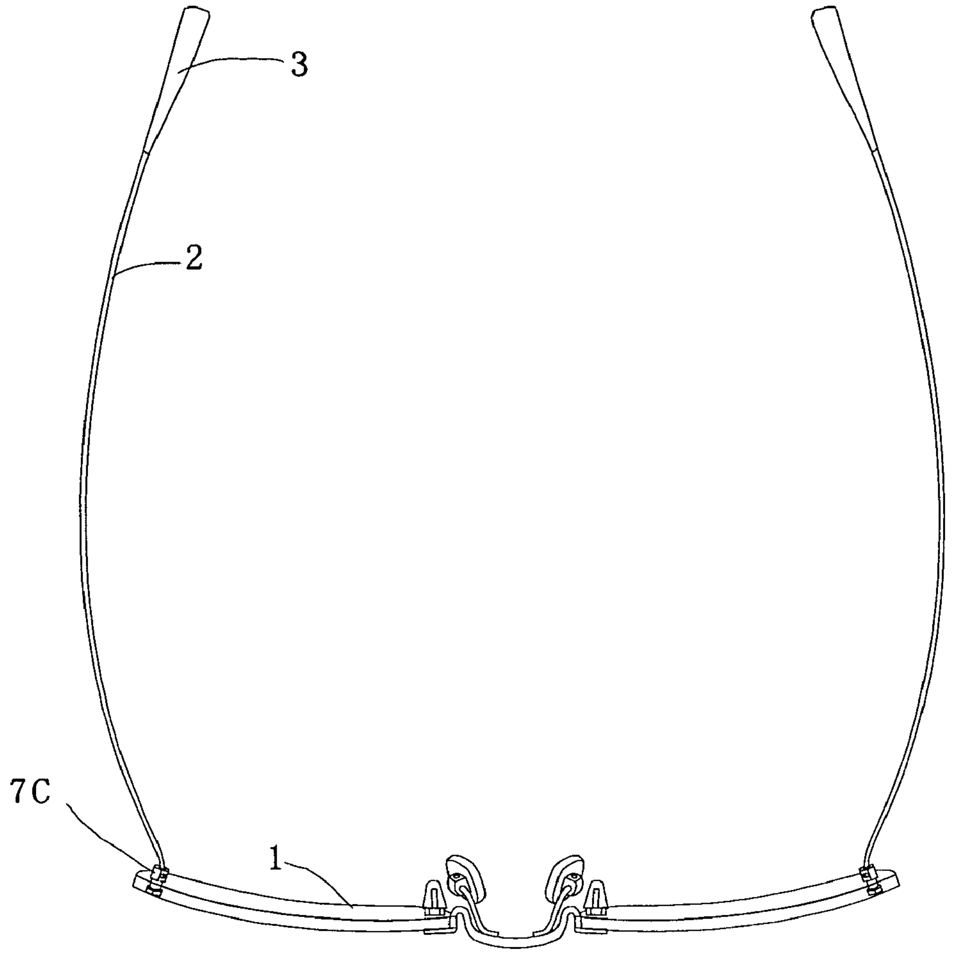
FIG. 19 is the Top view of the seventh embodiment of this invention.
Figure 20:
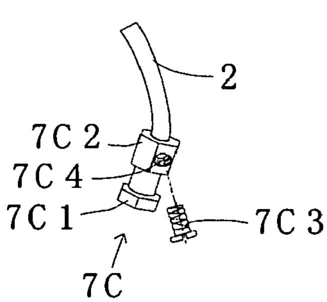
FIG. 20 is the Connection structure view of pin nail and rope in FIG. 19.
Figure 21:
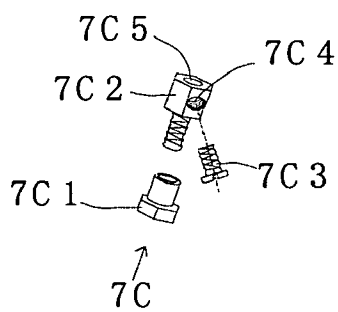
FIG. 21 is the exploded view of FIG. 20.

The seventh implementation method is illustrated in FIGS. 19 to 21.

"I" shape pin nail 7C includes nail body 7C1 of "T" shape and seat 7C2, the nail body 7C1 should be fit into the installation hole on lens, the seat 7C2 and nail body 7C1 should be combined together to clamp the lens 1 through screw connecting; an installation hole 7C5 is fixed on seat body 7C2, a screw hole 7C4 is fixed on vertical crossing point with installation hole 7C5; rope end 2 should be inserted into the installation hole 7C5 of seat body 7C2, bolt 7C3 should be screw in screw hole 7C4 to press the rope 2 tight.

Figure 22:
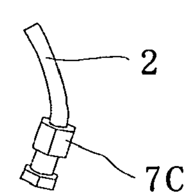
FIG. 22 is the Connection structure view of pin nail and rope in eighth embodiment of this invention.

FIG. 22 illustrate that in eighth implementation method, end of rope 2 is fixed on pin nail 7C of "I" shape.

Figure 23:
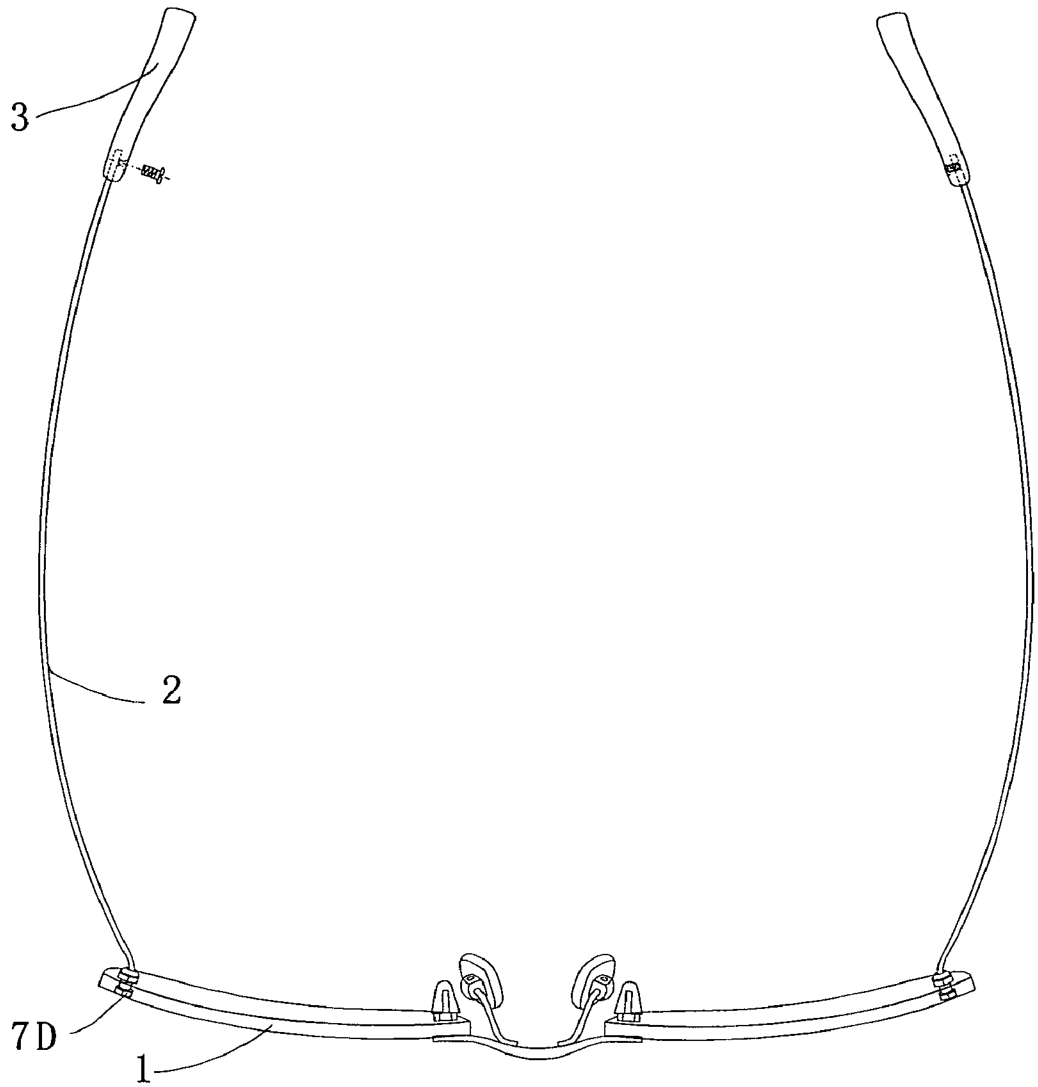
FIG. 23 is the Top view of the ninth embodiment of this invention.
Figure 24:
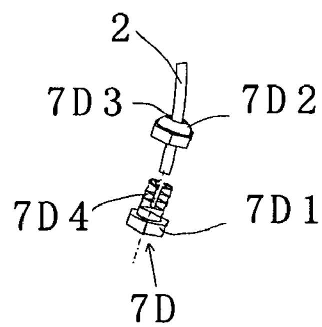
FIG. 24 is the Connection structure view of pin nail and rope in FIG. 23.
Figure 25:
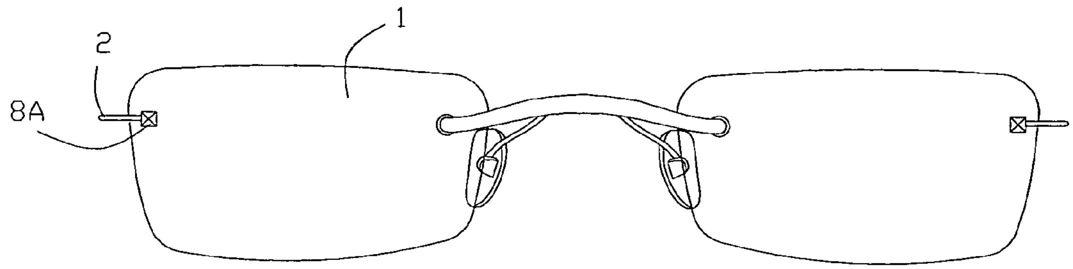
FIG. 25 is the front view of the tenth embodiment of this invention.
Figure 26:
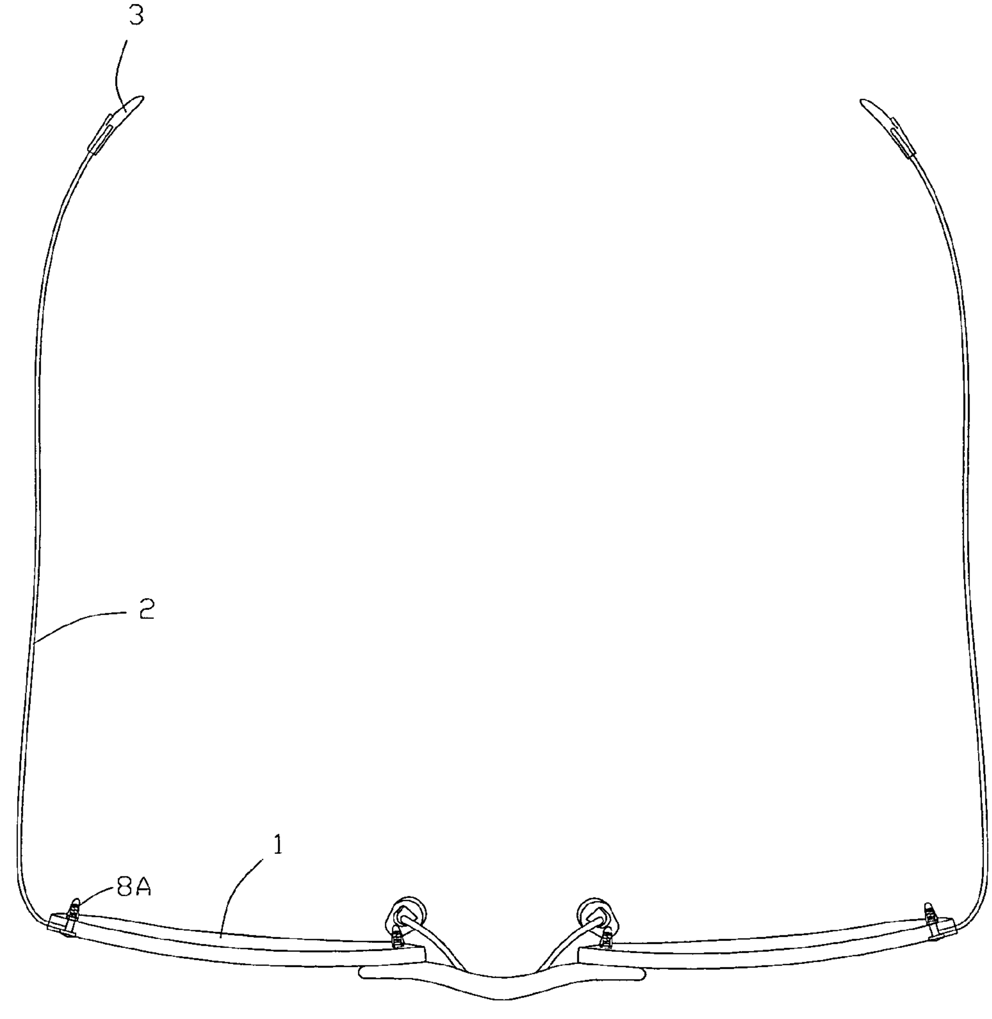
FIG. 26 is the Top view of FIG. 25.
Figure 27:
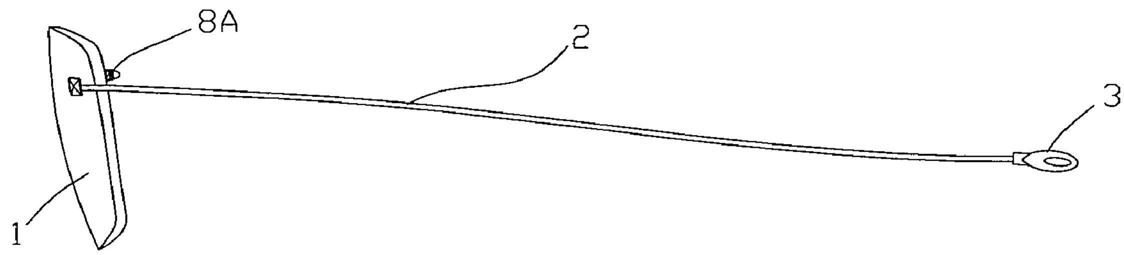
FIG. 27 is the Right side view of FIG. 25.
Figure 28:
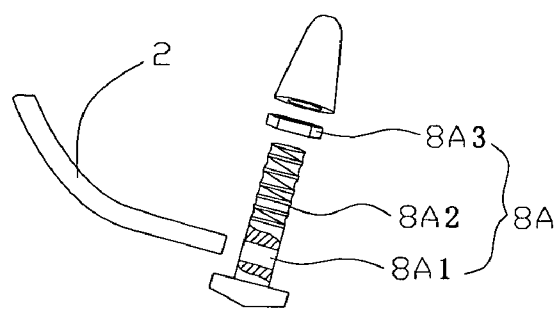
FIG. 28 is the Illustration diagram of pin nail in FIG. 25.
Figure 29:
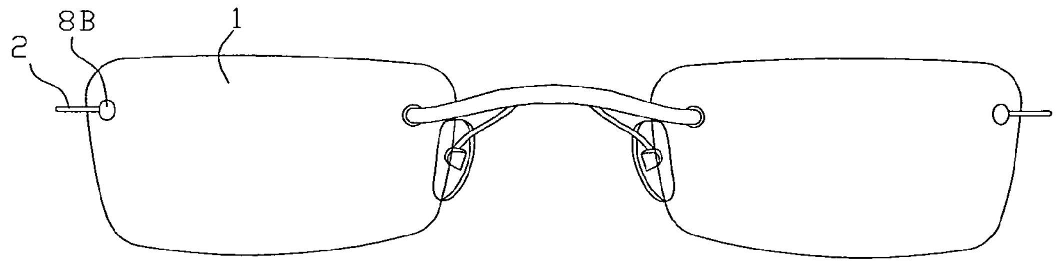
FIG. 29 is the front view of the eleventh embodiment of this invention.
Figure 30:
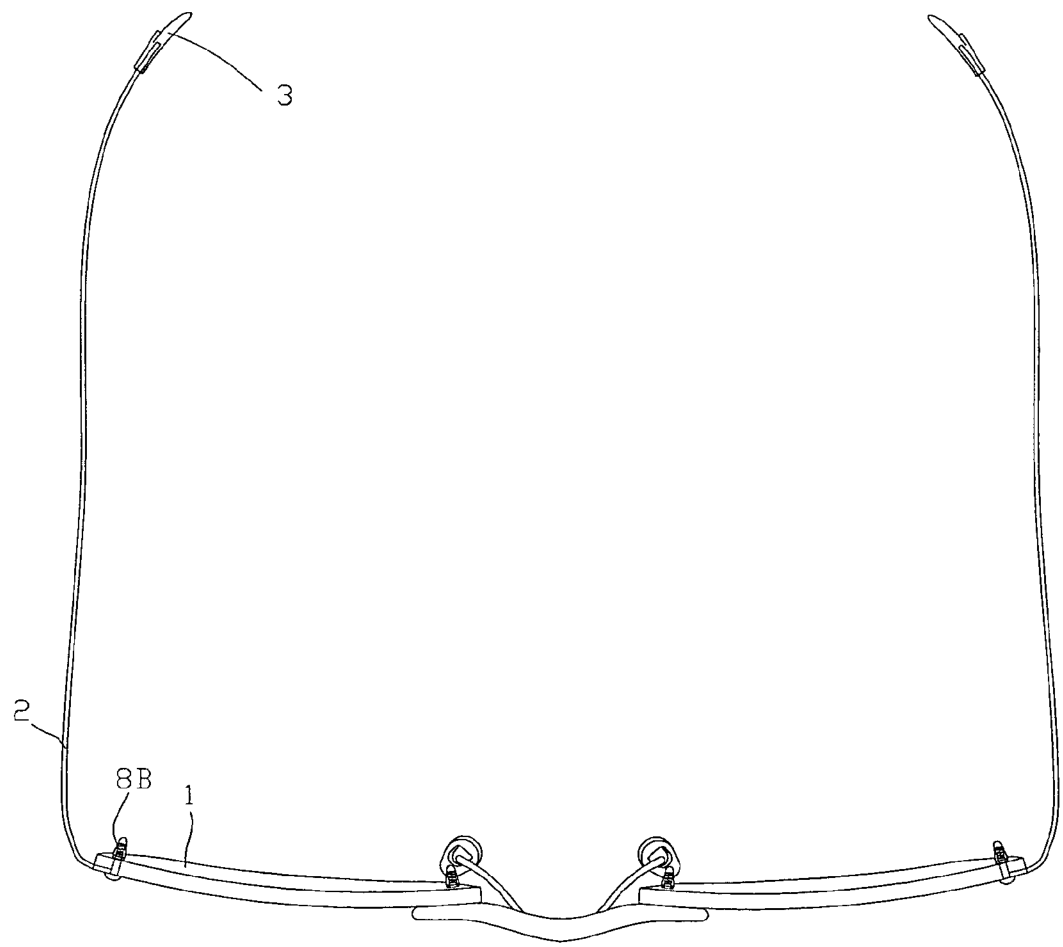
FIG. 30 is the Top view of FIG. 29.
Figure 31:
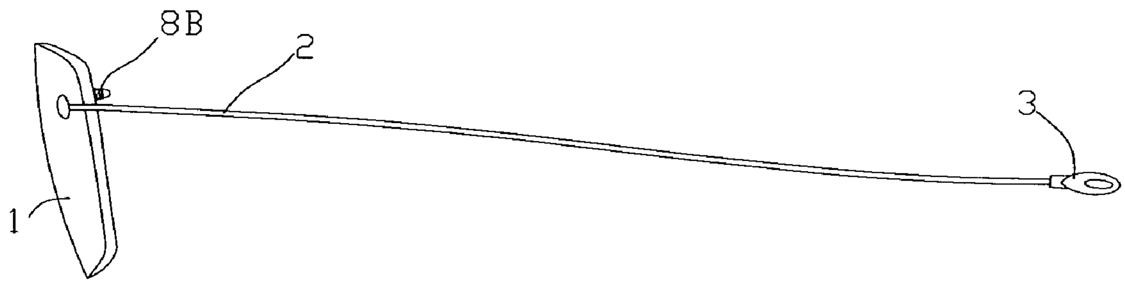
FIG. 31 is the Right side view of FIG. 29.
Figure 32:
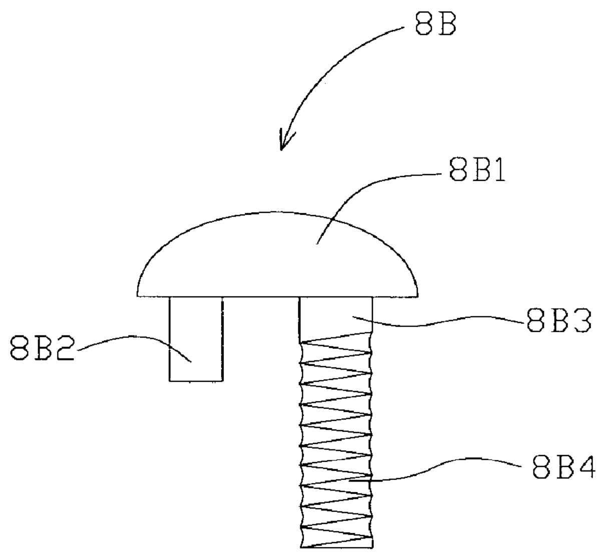
FIG. 32 is the Illustration diagram of pin nail in FIG. 25.
Figure 33:
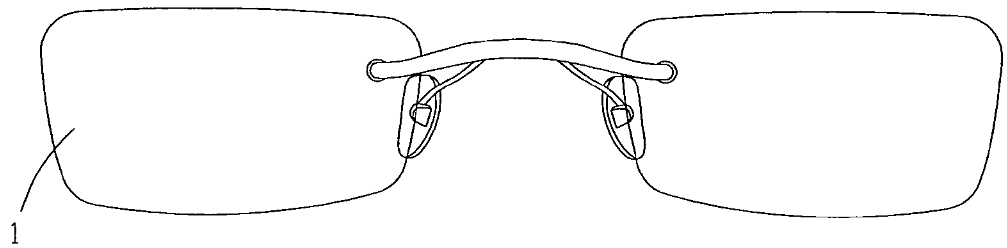
FIG. 33 is the front view of the twelfth embodiment of this invention.
Figure 34:
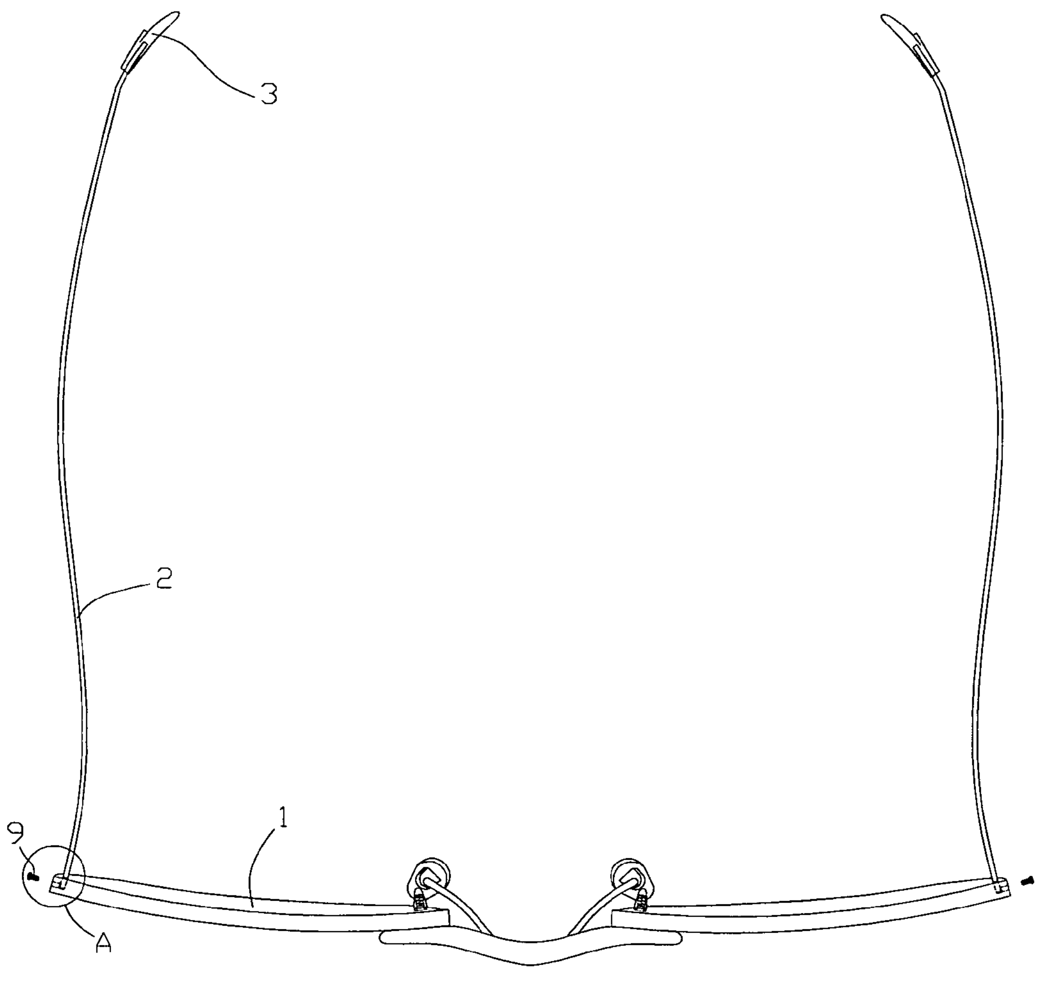
FIG. 34 is the Top view of FIG. 33.
Figure 35:
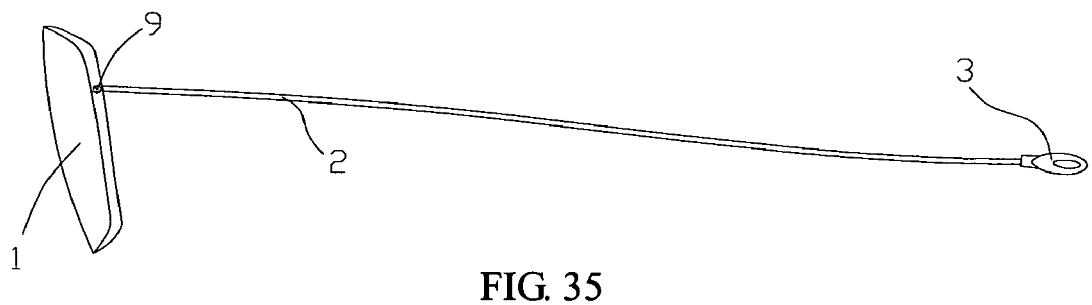
FIG. 35 is the Right side view of FIG. 33.
Figure 36:
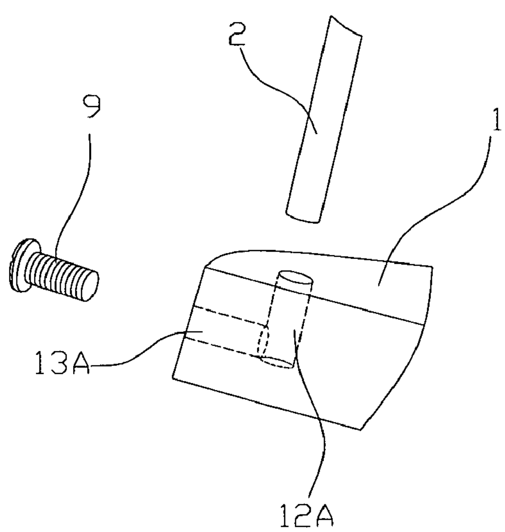
FIG. 36 is the Zoom in breakdown fig of Section A in FIG. 34.
Figure 37:
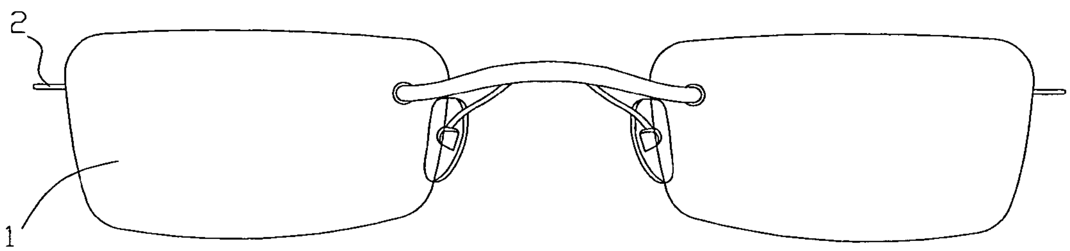
FIG. 37 is the front view of the thirteenth embodiment of this invention.
Figure 38:
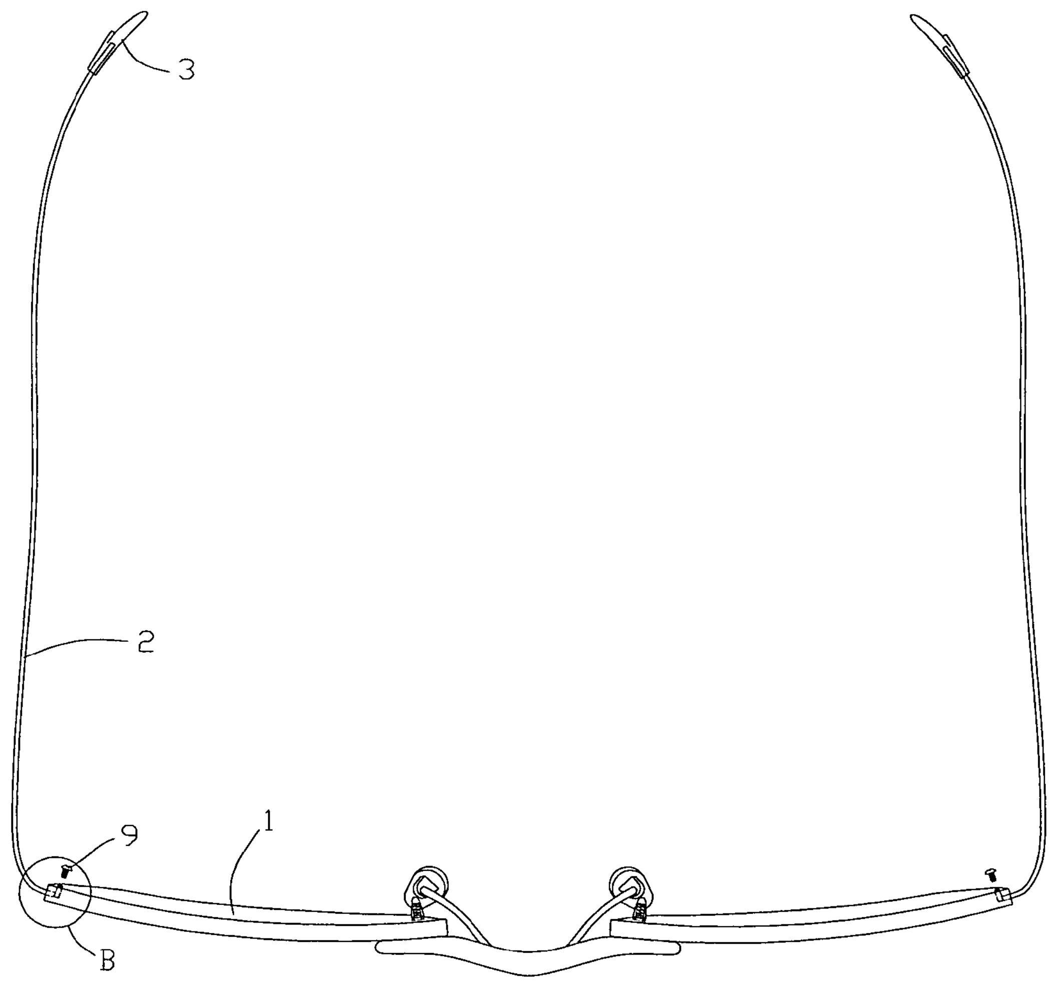
FIG. 38 is the Top view of FIG. 37.
Figure 39:
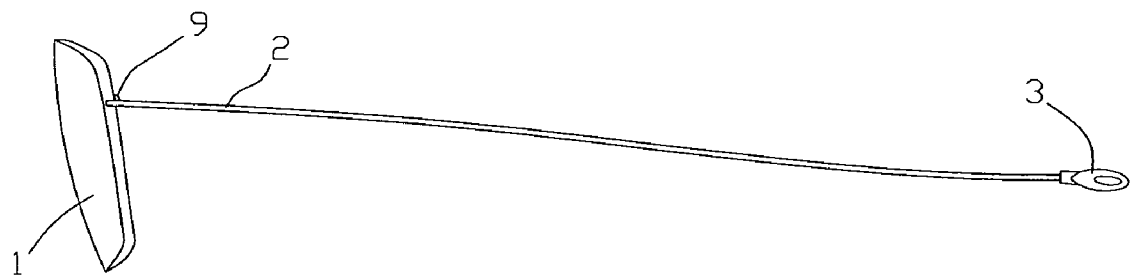
FIG. 39 is the Right side view of FIG. 37.
Figure 40:
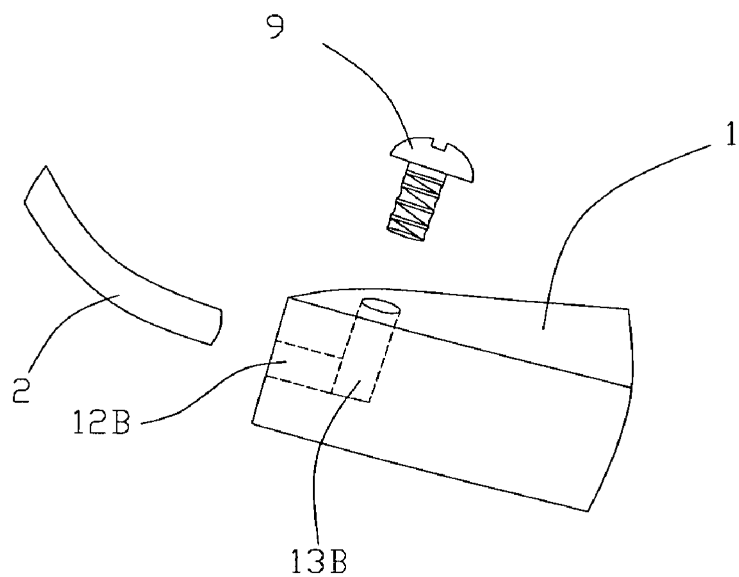
FIG. 40 is the Zoom in breakdown fig Section B in FIG. 38.
Figure 41:
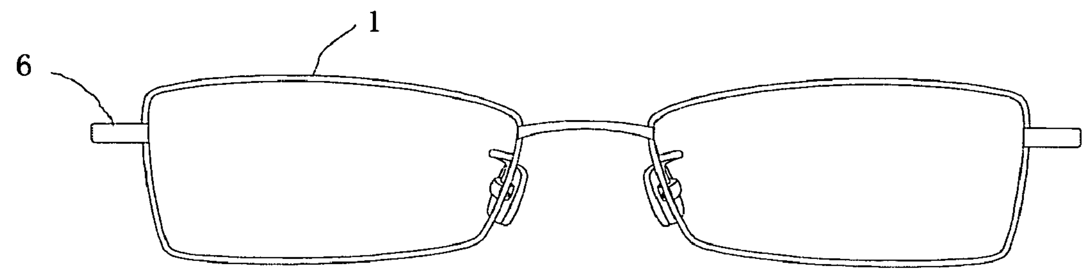
FIG. 41 is the front view of the fourteenth embodiment of this invention.
Figure 42:
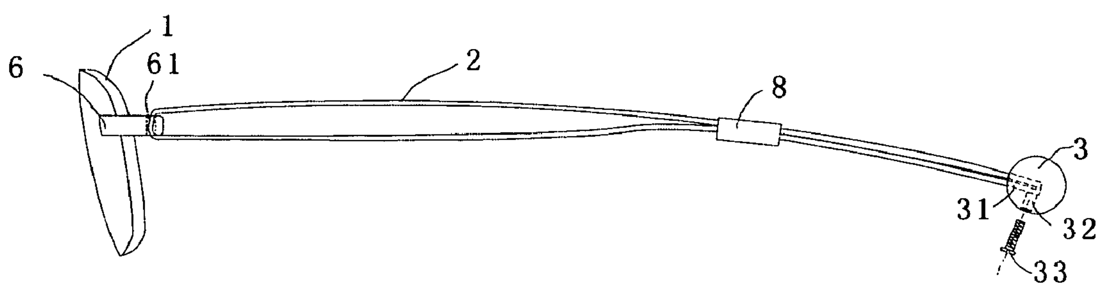
FIG. 42 is the Right side view of FIG. 41.
Figure 43:
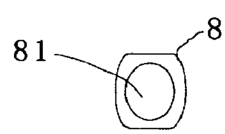
FIG. 43 is the front view of boot in FIG. 41.
Figure 44:
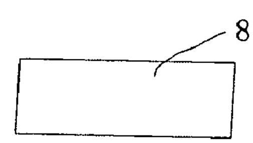
FIG. 44 is the Right side view of FIG. 43.

The ninth implementation method is illustrated in FIGS. 23 and 24.

"I" shape pin nail 7D includes nail body 7D1 of "T" shape and seat 7D2, external screw should be fixed on small section 7D4 of the nail body 7D1, through hole 7D3 with internal screw should be fixed on seat 7D2; nail body 7D1 should be fit into the installation hole on lens 1, the end of rope 2 should be inserted into thorough hole 7D3 on seat 7D2, the seat 7D2 and nail body 7D1 should be combined together to clamp the lens 1 through screw connecting and press the rope 2 tightly.

The tenth implementation method is illustrated in FIG. 25 to 28.

Glasses frame includes rope 2, pin nail 8A and tail nail 3; pin nail 8A are fixed on two lens respectively, take-in holes are fixed on outboard of two lens 1, pin nail 8A is set inside this take-in hole, pin nail 8A is in a approximately "T" shape, positioning hole 8A1 is fixed on a section with smaller diameter, position hole can penetrate crossly pin nail 8A or not, in this implementation method, position hole 8A1 penetrate pin nail 8A crossly, fastening section 8A2 is fixed on end side of outboard of positioning hole 8A1 on pin nail 8A, in this implementation method, fastening section 8A2 is a section of screw thread; there are two group of rope 2, each group is composed of one or multi piece of rope, in this implementation method, each group of rope 2 is composed of one piece of rope, rope 2 is made of bendable plastic material; the head of rope 2 is fixed inside positioning hole 8A1 of pin nail 8A, with the tail end fixed inside tail nail 3.

Upon installation, the head end of rope 2 is inserted into positioning hole 8A1 of pin nail 8A, pin nail 8A goes through take-in hole of lens 1, the section with larger diameter of pin nail 8A is on outboard of lens 1, and fastening section 8A2 of pin nail 8A with screw thread protrude a certain length out of surface of lens 1, then screw fastener 8A3 (such as nut) into fastening section 8A2 with screw thread, therefore press rope 2 tightly and tie the rope between the section with larger diameter of pin nail 8A and lens. Of course, the fastening section 8A2 can be smooth lever section, and the fastener 8A3 is clip reed, which clamp on this lever via clip reed and press rope 2 tightly. The structure of tail nail 3 is the same with above mentioned implementation method, and will not be repeated here again.

The eleventh implementation method is illustrated in FIGS. 29 to 32. Glasses frame includes rope 2, pin nail 8B and tail nail 3; pin nail 8B are fixed on two lens 1, take-in holes are fixed on outboard of two lens 1, pin nail 8B goes through the take-in hole, pin nail 8B includes a base 8B1 and No. 1 and No. 3 clamp section 8B/8B3 which extend straightly from both end of it, there is certain horizontal distance between No. 1 and No. 3 clamp section 8B/8B3, and fastening section 8B4 with screw thread is fixed on at least one clamp section, the length of clamp section with fastening section is larger than the length of the other clamp section; diameter of rope 2 is larger than the distance between the two clamp section 8B2/8B3; take-in holes are fixed on position on lens 1 corresponding to the two clamp section 8B2/8B3. Upon installation, the head end of rope 2 is crushed into the distance between the two clamp section 8B2/8B3, and two clamp section 8B2/8B3 are inserted into take-in hole respectively, screw in the fastening section 8B4 with screw thread with fastener, therefore press rope 2 and fix rope 2 tightly between base of pin nail 8B and lens 1, the fastener is nut. The structure of tail nail 3 is the same with above mentioned implementation method, and will not be repeated here again.

The twelfth implementation method is illustrated in FIGS. 33 to 36.

Installation hole 12A is fixed on outboard of lens 1 and fastening hole 13A (such as screw thread) is vertically connected with it, installation hole 12A is fixed on inward digging of internal surface of lens 1, fastening hole 13A is fixed on inward digging of wall of lens 1. Upon installation, the head end of rope 2 is inserted into installation hole 12A, and fastener 9 such as bolt is screwed into fastening hole 13A to press rope 2 tightly. The structure of tail nail 3 is the same with above mentioned implementation method, and will not be repeated here again.

The thirteenth implementation method is illustrated in FIGS. 37 to 40.

Installation hole 12B is fixed on outboard of lens 1 and fastening hole 13B (such as screw thread) is vertically connected with it, installation hole 12B is fixed on inward wall digging of lens 1, fastening hole 13B is fixed on inward digging of internal surface of lens 1. Upon installation, the head end of rope 2 is inserted into installation hole 12B, and fastener 9 such as bolt is screwed into fastening hole 13B to press rope 2 tightly. The structure of tail nail 3 is the same with above mentioned implementation method, and will not be repeated here again.

The fourteenth implementation method is illustrated in FIGS. 41 to 44.

one bundle of rope composed of rope 2 goes through installation hole 61 of bow end 6, which formed double folding rope, design corresponding to multi installation hole 61 can be made, of which each group of rope can be designed as composed of multi-piece of rope or one piece of rope to go through multi installation holes in order, which is actually rope bundle 2 composed of multi folding of rope but appear to be composed of multi pieces of ropes in form or other form.

For the sake of convenience, sleeve 10 with thorough hole 101 is fixed on middle part of each bundle of rope 2. The diameter of thorough hole 101 of sleeve 10 fit with total external diameter of rope, sleeve 10 slip on rope bundle and can move along it, multi piece of rope 2 allocated radiantly between sleeve 10 and lens 1, therefore hold the lens, the section of multi piece rope 2 between sleeve 10 and tail nail 3 is bind together and therefore will not affect the convenience and comfortable upon wearing.

Above is the optimal implementation of present invention, it will be apparent that various changes and modifications can be made without departing from the scope of the invention as defined in the claims.

What is claimed is:

1. A flexible glasses frame, comprising:

at least two bundles of soft rope fixed on the outer side of two lenses respectively, each bundle of soft rope comprising at least one piece of soft rope;

at least two tail nail fixed on the end of rope which is far away from lens.

2. The flexible glasses frame as claimed in claim 1, wherein an installation hole is fixed on outboard of the lens, said rope is fixed in installation hole on the lens.

3. The flexible glasses frame as claimed in claim 2, wherein said rope is made of plastic material, wherein said rope go through said installation hole and then the end of rope is melt to form an installation end bigger than the installation hole to be fixed inside the hole.

4. The flexible glasses frame as claimed in claim 1, wherein at least two installation holes is fixed on outboard of each lens, wherein said rope go through the installation hole on the lens.

5. The flexible glasses frame as claimed in claim 4, further comprising at least two connecting linker, a through hole being fixed on each linker, and the end of rope going through the hole on linker, then going through installation hole on outboard of the lens and through the hole on the linker again in order to fix the end of the rope.

6. The flexible glasses frame as claimed in claim 5, wherein said rope is made of plastic material, wherein said rope go through said through hole on linker then the end of rope is melt to form an installation bigger end to ensure the rope will not fall off the linkers.

7. The flexible glasses frame as claimed in claim 5, wherein a screw hole is fixed on vertical crossing point with linker, a bolt being fixed inside the screw hole, wherein the width of through hole fit with diameter of rope, the length meet the totals of two times of rope diameter plus diameter of bolt.

8. The flexible glasses frame as claimed in claim 1, wherein outboard of lens is fixed with an bow end, and at least one installation hole is fixed on each bow end, wherein said rope go through installation hole on bow end and form rope group of 2 sets of rope, wherein said tail nail is fixed on the end of rope group which is far away from bow end.

9. The flexible glasses frame as claimed in claim 1, wherein at least one pin nail is fixed on outboard of lens, and said soft rope is fixed on this pin nail.

10. The flexible glasses frame as claimed in claim 9, wherein said rope is made of plastic material, and its end is fixed on this pin nail by melting.

11. The flexible glasses frame as claimed in claim 9, wherein said pin nail is of "T" shape, with small end fixed with installation hole, a screw hole fixed on vertical crossing point with installation hole, wherein said rope is inserted into the installation hole of the pin, bolt screw in to press rope tightly.

12. The flexible glasses frame as claimed in claim 9, wherein said pin nail is of "I" shape, include nail body and seat of "T" shape, the nail body should be fit into the installation hole on lens, the seat and nail body should be combined together to clamp the lens through screw connecting; an installation hole is fixed on seat body, a screw hole is fixed on vertical crossing point with installation hole; rope end should be inserted into the installation hole of seat body, bolt should be screw in to press the rope tight.

13. The flexible glasses frame as claimed in claim 9, wherein said pin nail is of "I"shape, include nail body and seat of "T" shape, external screw thread is fixed on smaller section of nail body, and thorough hole with internal screw thread is fixed on seat body; the nail body should be fit into the installation hole on lens, rope end is inserted into thorough hole on seat body, the seat and nail body should be combined together to clamp the lens and press the rope tight through screw connecting.

14. The flexible glasses frame as claimed in claim 9, wherein said pin nail is of "T" shape, with smaller section fixed with installation hole and fastening section to the outboard of this installation hole; said rope is inserted into installation hole, the pin nail goes through the described lens, the larger section of this pin nail located on board of lens, the fastening section of this pin nail protrude out of lens surface and fixed with fastener so that rope is fastened between the larger section of this pin nail and lens.

15. The flexible glasses frame as claimed in claim 9, wherein said pin nail includes a base and first and second clamp section which extend from the base, there is a certain horizontal distance between first and second clamp section, and fastening section is fixed on at least one clamp section, said rope is fixed between two clamp section, the pin nail goes through lens, the fastening section of this pin nail protrude out of lens surface and fixed with fastener so that rope is fixed between the base of this pin nail and this lens.

16. The flexible glasses frame as claimed in claim 15, wherein diameter of the rope is large than the distance between two clamp sections.

17. The flexible glasses frame as claimed in claim 1, wherein said flexible frame of which the lens is fixed with installation hole, and fastening hole is connected with this installation hole, wherein said rope is inserted into installation hole, fastener is fixed into fastening hole to press the rope tightly.

18. The flexible glasses frame as claimed in claim 17, wherein said installation hole is fixed on inward digging of internal surface of lens, said fastening hole is fixed on inward digging of wall of lens.

19. The flexible glasses frame as claimed in claim 17, wherein said flexible frame of which installation hole is fixed on inward wall digging of lens, fastening hole is fixed on inward digging of internal surface of lens.

20. The flexible glasses frame as claimed in claim 1, further comprising at least two boot, through hole should be fixed on it, the diameter of the through hole meet the totals of diameter of rope, the boot is fixed and movable on the rope, the multi-piece rope between the boot and lens spread in radiation, the section between the boot and tail nail should be bind together.

21. The flexible glasses frame as claimed in claim 1, wherein said rope is made of plastic material, the end is connected to above mentioned tail nail by melting.

22. The flexible glasses frame as claimed in claim 1, wherein said tail nail is fixed with an installation hole, and a screw hole is fixed on connecting point with this installation hole, the rope is inserted into installation hole of the tail nail, bolt to be screw in to press the rope tightly.

* * * * *